(12) United States Patent
Twigg et al.

(10) Patent No.: US 6,696,031 B1
(45) Date of Patent: Feb. 24, 2004

(54) TREATMENT OF EXHAUST GAS

(75) Inventors: Martyn Vincent Twigg, Cambridge (GB); Robert James Brisley, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 10/018,022

(22) PCT Filed: May 30, 2000

(86) PCT No.: PCT/GB00/02062

§ 371 (c)(1),
(2), (4) Date: Mar. 19, 2002

(87) PCT Pub. No.: WO00/74823

PCT Pub. Date: Dec. 14, 2000

(30) Foreign Application Priority Data

Jun. 9, 1999 (GB) .............................................. 9913331

(51) Int. Cl.[7] .......................... C01B 21/26; C01B 21/36; C01B 31/20

(52) U.S. Cl. ................. 423/212; 423/213.2; 423/213.5; 423/213.7; 423/215.5; 423/239.1; 423/245.3; 423/247

(58) Field of Search ........................... 423/213.2, 213.5, 423/213.7, 215.5, 239.1, 245.3, 247

(56) References Cited

U.S. PATENT DOCUMENTS 4,902,487 A    2/1990   Cooper et al. ............ 423/215.5
5,746,989 A  * 5/1998   Murachi et al. ......... 423/212 R
6,004,524 A  * 12/1999  Morsbach et al. ....... 423/239.1
6,471,924 B1 * 10/2002  Feeley et al. ............ 423/213.5
6,546,717 B1 * 4/2003   Chandler et al. ............. 60/274

FOREIGN PATENT DOCUMENTS

| EP | 0 341 832 A2 | 11/1989 |
| EP | 0 758 713 A1 | 2/1997 |
| EP | 0 835 684 A2 | 4/1998 |
| WO | WO 00/21646 | 4/2000 |
| WO | WO 00/21647 | 4/2000 |
| WO | WO 00/34632 | 6/2000 |

OTHER PUBLICATIONS

P. Hawker; N. Meyers; G. Hüthwohl; H. Th. Vogel; B. Bates; L. Magnusson; and P. Bronnenberg, "Experience with a New Particulate Trap Technology in Europe," Copyright 1997 Society of Automative Engineers, Inc., SAE Technical Paper Series No. 970182, Reprinted from: Diesel Exhaust Aftertreatment (SP–1227) pp. 41–57.

* cited by examiner

Primary Examiner—Wayne A. Langel
(74) Attorney, Agent, or Firm—RatnerPrestia

(57) ABSTRACT

A process for treating exhaust gas from internal combustion engines wherein the combustion exhaust gas contains HC, CO, $O_2$, soot and possibly $NO_x$. In treating the combustion exhaust gas, HC is oxidized to $CO_x$ and $H_2O$: NO, if present, is oxidized to $NO_2$ and soot is oxidized by reaction with $NO_x$. In addition, $NO_x$ is generated by oxidizing ammonia and $NO_x$ is introduced into the exhaust gas upstream of the oxidization of soot by reaction with $NO_x$.

14 Claims, 1 Drawing Sheet

TREATMENT OF EXHAUST GAS

Figure 1:
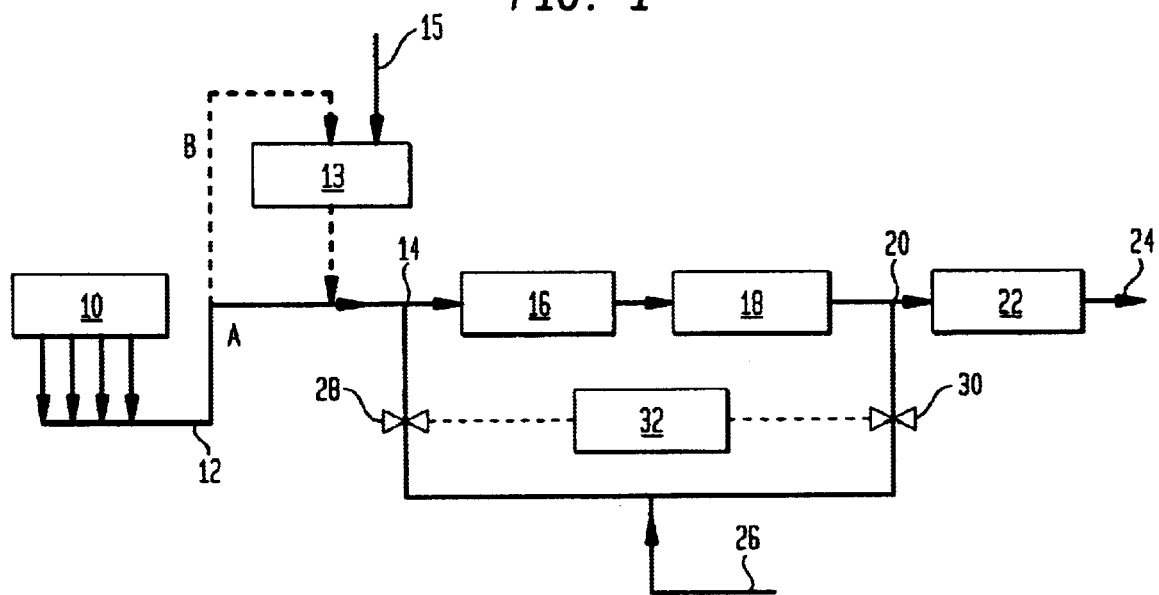

This application is the U.S. national phase application of PCT International Application No. PCT/GB00/02062.

This invention relates to treatment of exhaust gas, in particular from internal combustion engines.

Certain types of such engines, especially lean-burn engines such as diesels, produce exhaust gas containing inter alia nitrogen oxides (NOx) and combustible particulate (soot). The exhaust gases from lean-burn engines are net-oxidising, making the reduction of NOx to $N_2$ more difficult than in a gasoline engine system where approximately equivalent amounts of oxygen and fuel are used. Removal of soot has been made practicable by the Johnson-Matthey Continuously Regenerating Trap ("CRT"™) process (EPA-0341832, U.S. Pat. No. 4,902,487, incorporated herein by reference), in which soot is collected on a filter and oxidised by $NO_2$ that has been enriched in concentration by a preceding step of NO oxidation.

This process, however, is applicable only to exhaust containing, after the preceding oxidation step, at least enough $NO_2$ to oxidise the soot. If an engine is operated with low NOx generation a technical problem arises. The low NOx can result form engine design, expedients such as Exhaust Gas Recycle (EGR), temporaty non-normal load or fuel or temperature conditions, deliberate less-lean engine operation or by injection of reductant into the exhaust gas. The prior processes may convert NOx to $N_2$ to a small extent, for example 3–8%. (Hawker et al. SAE paper 970182).

According to the invention a process for treating combustion exhaust gas containing HC, CO, $O_2$, soot and possibly NOx that comprises the steps of:

i oxidising HC to $CO_2$ and $H_2O$, and NO (if present) to $NO_2$; and ii oxidising said soot by reaction with $NO_2$:

is characterised by the step of generating NOx by oxidising ammonia (as hereinafter defined) and introducing it into the exhaust gas upstream of step ii. Suitably soot is collected on a filter in step ii, but this is not presently regarded as essential if soot is collected or adheres to the walls or front face of a catalytic component or has an extended residence time in the equipments Conveniently such ammonia oxidation is effected in step i, using therein one or more catalysts effective alone or together to promote oxidation of HC, CO, NO and ammonia. Preferably HC and CO are oxidised in a first stage within step i and NO is oxidised to $NO_2$ with the fed ammonia in a second stage. (Such a divided step i is the subject of a co-pending GB application 99.13300.1, part of PCT application GB99/03971).

The term 'ammonia' in relation to added reactants includes also other compounds that produce NOx in the oxidising reaction conditions. Thus for example amino- or amido-compounds can be used, for example hydrazine, urea, guanidine, biuret, cyanuric acid, lower alkylamines such as methylamines, and nitroxy compounds. Ammonia itself or any of these can be injected with other materials, such as: (where appropriate) a non-interfering acid such as carbonic acid; another fluid, suitably providing a liquid solution at ambient temperature that may be oxidisable; steam; air.

The introduction of NOx ("first ammonia addition") may be continuous or intermittent.

Especially since the first ammonia addition increases the NOx content of the gas to a level above that due to the engine, the process preferably includes also, after step ii, a step of NOx removal. Several procedures are available for such NOx removal. The procedures are suitably based on catalytic methods, absorption methods, or a combination of both. Continuous catalytic decomposition of NOx to $N_2$ uses a lean-NOx catalyst possibly with adjustment of gas composition to equivalence or rich, or with injection of a NOx-specific reactant such as ammonia (using selective catalytic reduction, SCR). Absorption can be long-term (the absorber is eventually removed and regenerated) or short-term (the absorber is regenerated in-line). Regeneration can be achieved using temperature increase, or using the catalytic methods for decomposition of NOx to $N_2$. The preferred method of NOx removal is use of an absorbent that contains and/or is followed by a catalyst for the NOx-reducing reaction. The addition of a NOx-specific reactant and the use of SCR to regenerate the absorbent is especially preferred. The provision of NOx specific reactant downstream of step ii will be referred to as "second ammonia addition".

The source of ammonia for the second addition can be selected from the sources specified for the first addition, except for compounds containing oxidisable carbon radicals or reducible nitrogen radicals, since the second addition is to react with NOx to give $N_2$.

Whereas either ammonia addition can be continuous or intermittent, the intermittent/intermittent combination is preferred.

The first ammonia addition may be controlled to provide incomplete reaction or may be in excess, thereby slipping enough ammonia to provide the second ammonia addition.

The composition, temperature and flow-rate of engine exhaust commonly changes with time, for example when establishing steady conditions after start-up, or during changes in power output or chance variation. It is therefore desirable to control the exhaust treatment process to meet such changes. Intermittent first ammonia addition and the resulting NOx addition may be made in response to a signal from sensor means indicating that there is for example (i) inadequate NOx content in the gas leaving the engine; or (ii) increase in soot filter pressure drop which results because an engine has been operating for some time with inadequate NOx or exhaust temperature too low to combust soot on the filter, so that a build-up of soot takes place. The NOx addition is then made until the filter is substantially cleared.

If the oxidation of ammonia is effected over the step i catalyst, and if the engine is operated at varying levels of speed and/or load, such that the exhaust gas temperature varies, the first ammonia addition is made only when the temperature corresponds to formation of NOx from ammonia preferentially to reaction of ammonia with NOx. Since such intermittent ammonia produces an upward step in NOx content, the second ammonia addition will normally coincide in time with it or follow very soon after it. Such addition is controlled in response to detection of NOx exiting the absorber or to the (approaching) end of a time period designed for the absorber. This programmed regeneration period typically lasts 1 to 100 seconds.

The temperatures of the gas at the various stages of the process are controlled as follows:

(i) if the NOx addition is made by oxidising ammonia in step i, the temperature is desirably over 200° C., for example in the range 350°–500° C.;

(ii) for regeneration of a NOx absorber, the temperature should be for example 150°–300° C. This is easier to achieve if the second ammonia addition is intermittent, since intermittently higher temperature may be available in high speed engine running or can be obtained for example by oxidation of intermittently provided hydrocarbon in step i or on a pre-catalyst, typically for a time period of the same order as that of the second ammonia addition.

The catalysts and (if used) absorbent are suitably supported on a ceramic or metal honeycomb, coated with a surface-area enlarging washcoat comprising one or more of alumina, zirconia, silicon carbide or other, generally oxidic, material. Coated on the washcoat, in one or more layers, is the active catalytic and/or absorptive material, to be described in more detail below. The honeycomb has typically 50–400 cells per square inch, possibly more, eg up to 1200. The range 200–900 is of general application.

In the oxidation catalyst the active material comprises generally a platinum group metal ("PGM"), especially platinum and/or palladium, optionally with other PGMs, eg rhodium, and other catalytic or promoting components. The exact composition and structure of the oxidation catalyst is not critical to operation of the invention, and hence may be varied according to the requirements of the situation. A low temperature light-off formulation is generally preferred. Conventional manufacturing techniques may be used. The catalyst should of course be sized and composed to achieve the necessary conversions, and the design should minimise trapping of soot.

The filter may be any capable of trapping the soot without causing excessive back-pressure. In general, ceramic, sintered metal or woven or non-woven wire filters are usable, and wall-flow honeycomb structures may be particularly suitable. The structural material of the filter is preferably porous ceramic oxide, silicon carbide or sintered metal. A coating such as alumina, and also a catalyst such as La/Cs/$V_2O_5$ or PGM may be present. The soot is generally carbon and/or heavy hydrocarbons, and is converted to carbon oxides and $H_2O$. Certain embodiments of this principle are described in the above-referenced patent documents, the teaching of which is incorporated herein by reference.

The absorbent may be selected from:
(a) compounds of alkali metals, alkaline earth metals, rare earth metals and transition metals, capable of forming nitrates and/or nitrites of adequate stability in absorbing conditions and of evolving nitrogen oxides and/or nitrogen in regenerating conditions;
(b) adsorptive materials such as zeolites, carbons and high-area oxides. Compounds (a) may be present (before NOx absorption) as composite oxides, eg of alkaline earth metal and copper such as Ba—Cu—O or $MnO_2$—$BaCuO_2$, possibly with added Ce oxide, or Y—Ba—Cu—O and Y—Sr—Co—O. (The oxides are referred to for simplicity, but in practice hydroxides, carbonates and nitrogen acid salts are present, depending on the temperature and gas composition).

Whichever compounds are used, there may be present also, in and/or following the absorbent, one or more catalytic agents, such as precious metals, effective to promote such reactions as the interchanges of the nitrogen oxides and the action of reductants, and/or of NOx-specific reactants, especially ammonia. If such catalytic agent is present, that is, the absorber is 'catalysed', it may be for example a co-precipitated or co-impregnated or co-deposited with the absorbent or present as one or more sandwiched layers or as fine (eg 10–500 microns) particles on or in a layer of absorbent or among particles of absorbent.

The NOx reduction catalysts may be for example: lean-NOx: copper on zeolite (eg ZSM-5) or PGM on alumina or on zeolite (eg mordenite); TWC: platinum and rhodium on alumina; SCR: $V_2O_5/TiO_2$ or PGM or copper; in each case on a honeycomb structural support.

If ammonia oxidation is effected in a step distinct from step i then the catalyst suitably comprises supported platinum, suitably as in step i. If the fed NOx is to be intermittently supplied by external ammonia oxidation, a trickle of ammonia may be fed between such intermittent supplies, so that the exothermic reaction keeps the external catalyst warm and ready for quick response.

The invention provides a system comprising apparatus integers corresponding to the process as herein defined; and, further, a diesel engine having such an exhaust treatment system. The engine may be for example a heavy duty engine to be used for a duty including idling periods and/or temporary rich running. Another example is a light duty engine, especially if fitted with EGR and/or intended for duty including idling periods. Whichever category of diesel engine is used, it is operated preferably with a fuel containing less than 50 ppm w/w of sulphur compounds, calculated as S. Examples of low-S fuels are 'Swedish Environmental Class I diesel' and 'City diesel'. If fuel of more than 50 ppm S is used, the system should include a sulphate trap.

The invention, at least in preferred forms, provides a process, system or engine capable of operation in compliance with projections of European Stage IV, as published in Directive 98/69/EC.

One preferred form of the invention is illustrated by reference to the accompanying drawing, which is a flow-sheet of the process and system.

Referring to the drawing, engine 10 is a 4-cylinder in-line diesel. Its exhaust manifold and pipe 12 are lagged and lead via path A or path B to mixing point 14. Path A is direct and is used if the temperature of the exhaust gas is high enough for efficient operation of subsequent stages. Path B, to be used if the gas temperature needs to be increased, leads to oxidation pre-catalyst 13, on which hydrocarbons and CO react with $O_2$ to provide an exotherm. Hydrocarbons reacting on catalyst 13 may be present as a result of incomplete combustion in normal engine operation or may be provided or supplemented by injection ahead of catalyst 13 or by temporary less-lean operation of the engine. At point 14 ammonia gas may be injected. The gas then passes to oxidation catalyst 16, comprising platinum on alumina on a ceramic honeycomb having 400 cells per square inch. The outlet of catalyst 16 is connected to the inlet of soot filter 18, which comprises a ceramic honeycomb having porous internal walls permeable to gas but not to the soot. In 18 the soot undergoes combustion by reaction with $NO_2$ formed in 16. The outlet from 18 leads to mixing point 20 at which ammonia gas may be injected, and thence to reactor 22, which provides alternatively:
(a) selective catalytic NOx removal (SCR); or
(b) NOx absorption combined with and/or followed by NOx reduction catalyst.

In either event the catalyst and absorbent are supported on a washcoated honeycomb structure similar to that used in 16. The outlet of 22 is into tailpipe 24 and thence to atmosphere.

Ammonia is taken from external supply 26 and fed as required to mixing points 14 and 20 via valves 28 and 30 respectively. Valves 28 and 30 are under the control of a computer shown generally by 32. Computer 32 receives gas composition data and temperature data from sensors (not shown) just upstream of point 14 and is programmed to operate the actuator of valve 28 to open when the NOx level in the gas is too low to combust the soot in filter 18 and when the temperature is correct for oxidation of ammonia to NOx. It may also respond to: tail pipe gas composition, to ensure that the final gas does not contain unreacted ammonia or too much NOx; and/or to pressure-drop across filter 18, to give warning of incomplete soot combustion.

If path B and catalyst 13 are used, computer 32 also receives gas temperature data from a sensor (not shown) just upstream of point 14 and is programmed to inject hydrocarbon at the inlet 15 of catalyst 13 or to adjust the engine inlet air/fuel ratio to provide such hydrocarbon.

Among the modes of operation of the invention the following are particularly envisaged:

1. In steady engine running a feed of ammonia to point 14 is maintained continuously, giving sufficient NOx and (from 16) sufficient $NO_2$ to combust the soot collecting in 18. At the same time a feed of ammonia to point 20 is maintained continuously and reacts with NOx in the gas leaving filter 18 over SCR catalyst 22, to give $N_2$.

2. The feed of ammonia to point 14 is the same as in mode 1 or can be varied to meet changes in operating conditions. However, reactor 22 now contains a NOx absorbent followed by an SCR catalyst Since NOx in the gas leaving filter 18 is now absorbed in 22, feed of ammonia to point 20 is withheld until the NOx absorbent is well charged, set going until the absorbent is regenerated, then withheld again. Mode 2 has an advantage over mode 1 that the reaction of NOx with ammonia takes place at a higher concentration of reactants. It also provides a margin of safety for an engine operated with varying speeds and loads.

What is claimed is:

1. Process for treating combustion exhaust gas containing HC, CO, $O_2$, soot and possibly NOx, wherein the process comprises the steps of:

(i) oxidising HC to $CO_2$ and $H_2O$;

(ii) oxidising NO (if present) to $NO_2$; and (iii) oxidising said soot by reaction with $NO_2$
        wherein the improvement comprises the step of generating NOx by oxidising ammonia and introducing NOx into the exhaust gas upstream of step (iii).

2. Process according to claim 1 in which ammonia oxidation is effected in step i.

3. Process according to claim 1, wherein step (i) precedes step (ii).

4. Process according to claim 3, wherein the ammonia oxidation is effected in step (ii).

5. Process according to claim 1 further comprising, after step (iii), a step of NOx removal.

6. Process according to claim 5 comprising absorption of NOx, with intermittent in-line regeneration by injection of a NOx-specific reactant and reaction over an SCR catalyst, the catalyst being present in and/or following the absorbent.

7. Process according to claim 6 in which ammonia oxidation is controlled to provide incomplete reaction, thereby slipping enough ammonia to provide the NOx-specific reactant.

8. Process according to claim 1 in which the step of introducing NOx into the exhaust gas is controlled in response to a signal from sensor means indicating that, in the gas entering step (ii), the content of NOx is or has become too low and/or the content of soot is or has become too high, relative to oxidation of soot by $NO_2$ in step (ii).

9. Process according to claim 8 in which said injection of NOx-specific reactant is controlled in response to:

(a) tail pipe gas composition sensor indication of NOx or ammonia in excess of design; and (b) if a NOx absorber is used, programmed regeneration period.

10. Process according to claim 1 in which the step (i) catalyst, the step (ii) catalyst or the step (i) and step (ii) catalysts is a supported platinum group metal.

11. Process according to claim 1 in which soot is collected on a filter.

12. Process according to claim 1 in which steps (i), (ii), and (iii) are carried out in a continuously regenerating trap system.

13. Process according to claim 1 in which the exhaust gas is the product of an engine operated with a fuel containing less that 50 ppm w/w sulphur compounds calculated as S.

14. Process according to claim 6, wherein the NOx-specific reactant is ammonia.

* * * * *